Patented Oct. 18, 1932

1,882,734

UNITED STATES PATENT OFFICE

CLIFFORD L. BARBER, OF CHICAGO, ILLINOIS, ASSIGNOR TO KESTER SOLDER COMPANY, OF CHICAGO, ILLINOIS, A CORPORATION OF ILLINOIS

SOLDERING FLUX

No Drawing.   Application filed December 16, 1929. Serial No. 414,593.

This invention relates to a soldering flux for use either in cored solders or as an external flux.

An ideal soldering flux should be fast and efficient as a fluxing agent on a wide variety of metals and the residue of such ideal flux after soldering should not be corrosive, electrically conductive, hygroscopic or unsightly, or harmful to the operator. In actual practice it has been found impossible to obtain a flux possessing all of these properties but the present invention relates to a flux that more nearly approaches the ideal than heretofore known fluxes.

Of the two general types of fluxes, namely rosin and inorganic chloride fluxes, the rosin flux, while fast and efficient on a few metals, such, for instance, as copper, does not possess the general fluxing activity sufficient to enable it to cope with certain other metals, such as nickel and zinc. The inorganic chloride fluxes, on the other hand, are corrosive toward metals and their residues are electrically conductive, thus aiding and promoting electrical leakage. The natural corrosive and conductive tendency of these residues is still further augmented by the inherent hygroscopic character of the fluxes themeselves, since the absorption of water liberates free hydrochloric acid by hydrolysis and therefore leads to further destructive action. Furthermore, such residues are unsightly and generally disagreeable to handle.

It is therefore an important object of this invention to provide a soldering flux of novel composition having especially desirable properties.

It is a further important object of this invention to provide a soldering flux of a nature that is equally as fast and efficient as any of the inorganic chloride fluxes and yet that is non-hygroscopic and that possesses just the proper stability or tendency for thermal decomposition that under the heat of the soldering operation itself, the flux residue is decomposed, volatilized, carbonized or otherwise converted into volatile material so that no unused residue may be left to corrode the metal or promote electrical leakage, harm operators, or leave an unsightly appearance.

Other and further important objects of this invention will become apparent from the following description and appended claims.

I have found that organic ammonium derivatives possess desirable properties for use as soldering fluxes either alone or in mixtures. This field includes organic amides, such as urea and acetamide, and aliphatic and aromatic amines or derivatives thereof. Examples of suitable aliphatic amines or derivatives thereof are methylamine hydrochloride and betaine hydrochloride and of aromatic amines, aniline hydrochloride.

A preferred embodiment of my invention is illustrated by the following composition:

|                        | Per cent |
|------------------------|----------|
| Urea                   | 78       |
| Aniline hydrochloride  | 12       |
| Water                  | 10       |

A flux of this composition is especially suitable for use in connection with hollow, or cored, wire solder, the water being present for facilitating the filling of the solder tube. It will be specifically understood, however, that the precentage of these ingredients may be varied through a wide range and that the water may even be omitted. It will also be understood that the flux may be used either in cored solder or as an external flux.

Urea is itself a fluxing agent and may be used alone but preferably aniline hydrochloride is mixed with the urea to speed the fluxing action. Both urea and aniline hydrochloride are normally solid but melt under ordinary soldering temperatures, which may be considered as being from 375° F. to 600° F. Furthermore, urea and aniline hydrochloride possess just the proper tendency to completely dissociate and/or volatilize such that under the heat of the soldering operation very little residue is left on the work after soldering. In addition, neither urea nor aniline hydrochloride is hygroscopic so that the slight amount of residue which might remain after soldering may be easily removed. In fact, such residue will usually dry up and blow away. Electrical leakage is, therefore, reduced to a minimum by virtue of the fact that practically no residue is left to complete an electrical circuit.

Other organic amine hydrochlorides, such as methylamine hydrochloride, betaine hydrochloride or the like may be used in place of aniline hydrochloride in the preferred composition or such substances may be used by themselves as fluxes. The effectiveness of these organic amines and their derivatives may be due to the fact that structurally they resemble ammonium chloride, methylamine hydrochloride and aniline hydrochloride being in effect merely the alkyl and aryl substitution products, respectively of ammonium chloride. I have found that these organic ammonium derivatives actually possess a fluxing power fully equal to that of zinc or ammonium chloride. All of the specific compounds mentioned are fast and efficient fluxes on a wide variety of metals but in other respects some of them are more satisfactory than others. For instance, urea and aniline hydrochloride have the advantage of being relatively cheap.

The advantages of fluxes of my invention are that they are equally as fast and efficient as any of the inorganic chloride fluxes, and faster and more efficient than any noncorrosive flux of which I have knowledge. Furthermore, my fluxes are harmless to workers and do not produce sores, burns, or the like, as the astringent inorganic chloride fluxes do, nor do my fluxes cause electrical leakage to any appreciable extent due to the fact that they are largely volatilized or converted into volatile substances during the soldering operation and are not hygroscopic. In the case of inorganic fluxes, moisture or water present results in hydrolysis with the liberation of free hydrochloric acid and it is this that causes the destructive corrosion and electrical leakage. In the organic fluxes of my invention, the fact that they are not hygroscopic and are furthermore not readily hydrolyzed, reduces the possibility of corrosion from this cause.

I am aware that numerous details of the process may be varied through a wide range without departing from the principles of this invention, and I, therefore, do not purpose limiting the patent granted hereon otherwise than necessitated by the prior art.

I claim as my invention:

1. A soldering flux comprising urea and an hydrochloride of an organic amine.

2. A soldering flux comprising urea and aniline hydrochloride.

3. A soldering flux comprising approximately 78% urea, 12% aniline hydrochloride and 10% water.

4. A soldering flux comprising acetamide.

5. A soldering flux comprising methylamine hydrochloride.

6. A soldering flux comprising a mixture of acetamide and methylamine hydrochloride.

7. A soldering flux comprising betaine hydrochloride.

8. A soldering flux comprising a mixture of urea and betaine hydrochloride.

9. A soldering flux comprising aniline hydrochloride.

10. In the art of soldering, the step of cleaning the metal surfaces and facilitating the flow of solder thereon which comprises applying aniline hydrochloride thereto and releasing hydrogen chloride therefrom by heat.

11. A soldering flux comprising a mixture of an organic amide and an amine hydrochloride, the ingredients of said mixture being normally solid and melting below soldering temperature.

In testimony whereof I have hereunto subscribed my name at Chicago, Cook County, Illinois.

CLIFFORD L. BARBER.